July 11, 1967 K. MECKY 3,330,414
PRESSURE LID FOR FILTER PRESSES
Filed June 6, 1966 6 Sheets-Sheet 1

INVENTOR
Karl MECKY
By Walter Becky

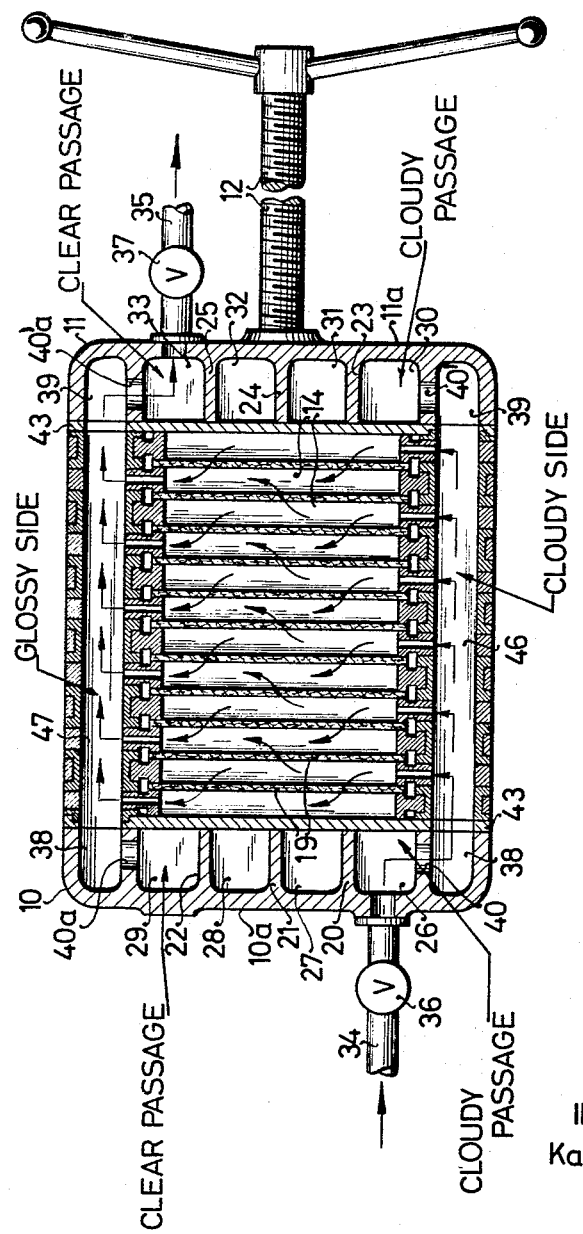

INVENTOR
Karl MECKY

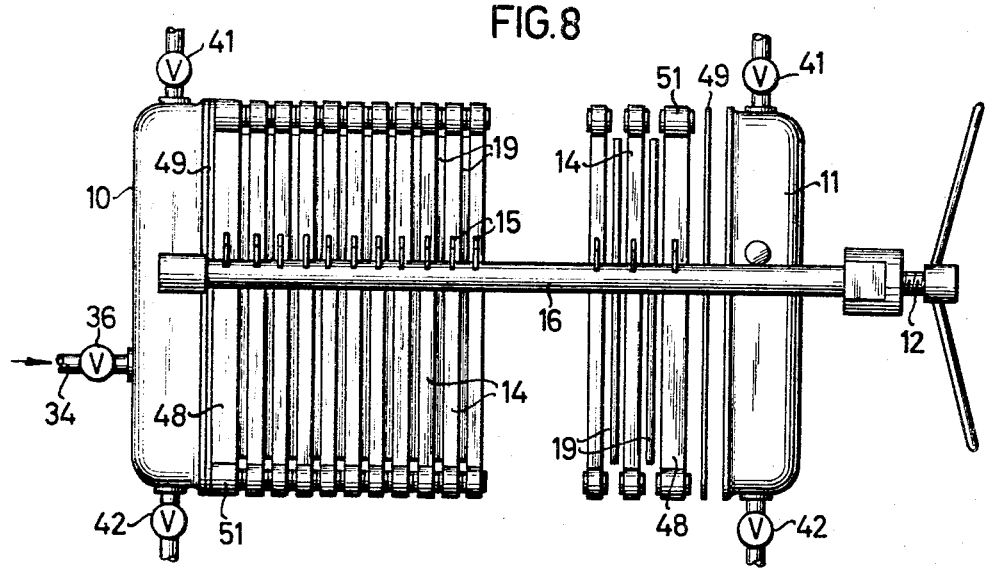
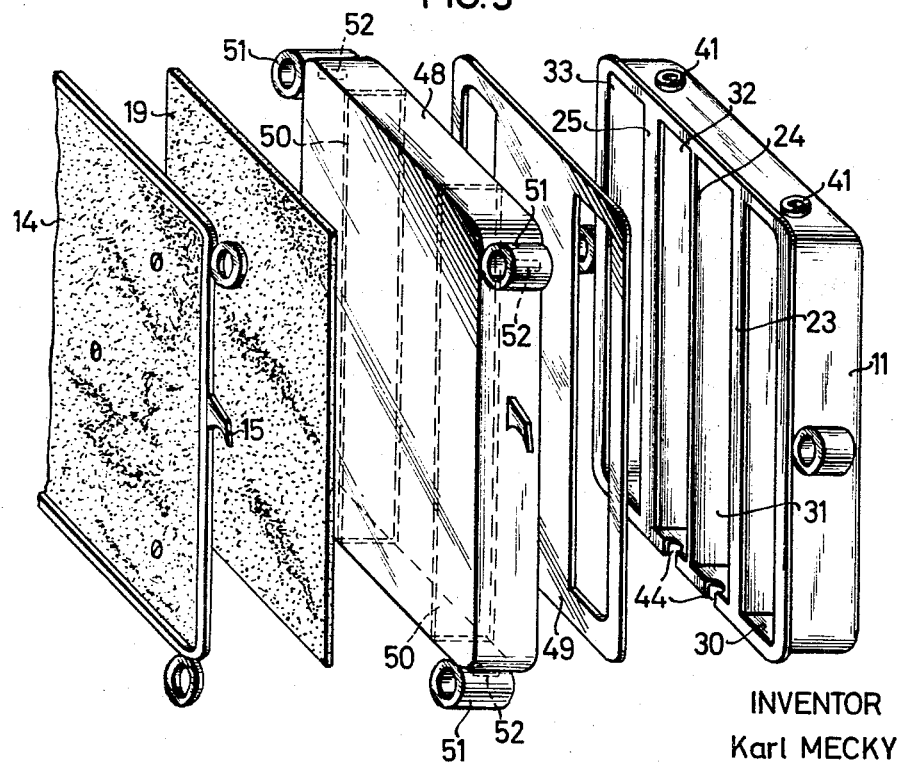

United States Patent Office 3,330,414
Patented July 11, 1967

3,330,414
PRESSURE LID FOR FILTER PRESSES
Karl Mecky, Bad Kreuznach, Germany, assignor to Seitz-Werke G.m.b.H., Bad Kreuznach, Germany
Filed June 6, 1966, Ser. No. 555,505
Claims priority, application Germany, May 17, 1962, S 79,484
11 Claims. (Cl. 210—227)

This is a continuation-in-part application of my copending application Ser. No. 280,221, filed May 14, 1963, now abandoned and entitled "Pressure Lid For Filter Presses."

The present invention relates to a filter press and, more specifically, to lid means or head plates for a filter press. In filter presses with a stationary lid having valve means mounted thereon and with a movable lid, the filter elements are compressed between the lids in the form of a packet, while the supply and withdrawal of the liquid is effected in customary manner through ascending pipes or risers and connecting passages arranged on the oppositely located lids and communicating with the filter packet.

With heretofore known plate-shaped lids, these liquid guiding pipes and passages were cast-in as closed passages or were mounted in the form of ascending pipes or risers on the outside of the respective lid. With heretofore customary hood-shaped lids, also risers or ascending pipes are employed which are fixedly or detachably connected to the inside of the hollow chamber confined by the lid walls.

Experience has shown that closed liquid guiding means in the form of ascending pipes, risers or passages are difficult and costly to clean. Also the provision of a protective surface coat is difficult to apply when employing the said closed liquid guiding means.

It is, therefore, an object of the present invention to provide lid means for filter presses which will overcome the above-mentioned drawbacks.

It is another object of this invention to provide hood-shaped lid means for filter presses which will afford easy access and easy cleaning of the liquid guiding means within the lid means.

These and other objects and advantages of the invention will appear more clearly from the following specification in connection with the accompanying drawings, in which:

FIGURE 3a is a longitudinal horizontal section similar to that of FIG. 3 of a modified filtering apparatus which differs from that of FIG. 1 in that the cloudy passage inlet and the clear passage outlet are on opposite ends of the apparatus;

FIGURE 8 shows a filter press similar to that of FIG. 1, but differing therefrom in the filter element adjacent the movable lid;

FIGURE 9 is an exploded isometric view of a portion of the right-hand side of FIG. 8.

The filter press lid according to the present invention is characterized primarily in that the interior of the lid is subdivided by one or more partitions which are substantially perpendicular to the bottom of the lid and which are open toward the filter packet. The thus created compartments will, when the press is closed, together with a first element of the filter packet, confine liquid conducting passages. In particular, when employing hood-shaped lids for the filter press, the said partitions will contribute to the stiffness of the lid. In most instances, the partitions are sufficient so that the heretofore customary stiffening ribs may be omitted.

According to a preferred embodiment of the invention, that element of the filter packet which is adjacent a lid is likewise shaped like a hood and is provided with longitudinal ribs in conformity with the partitions of the lid. In this way, when the press is closed, the cross section of the respective fluid passages connecting the filter inlet and the filter outlet with the filter packet will be enlarged.

Figure 1:
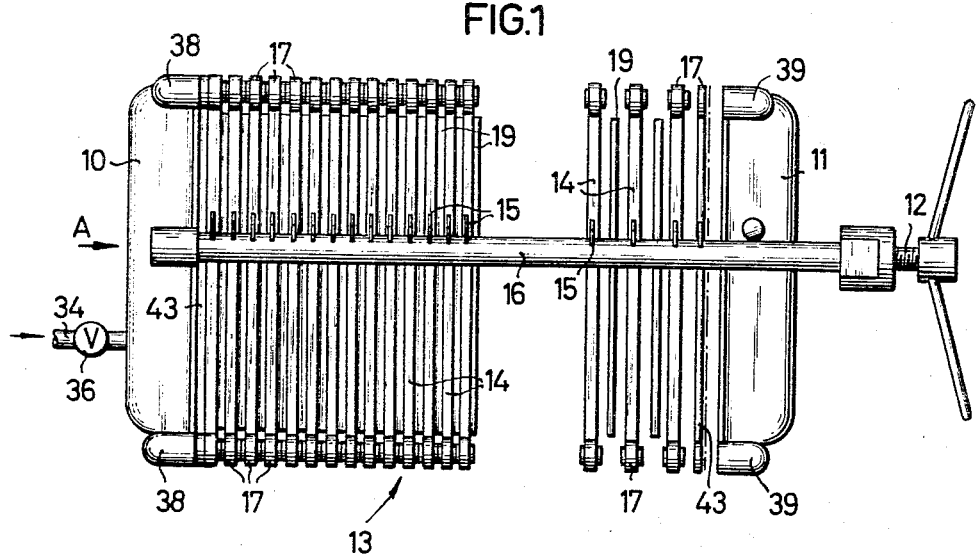
FIGURE 1 is a diagrammatic side view of a filter press in partly assembled condition and with lids designed in conformity with the present invention.
Figure 2:
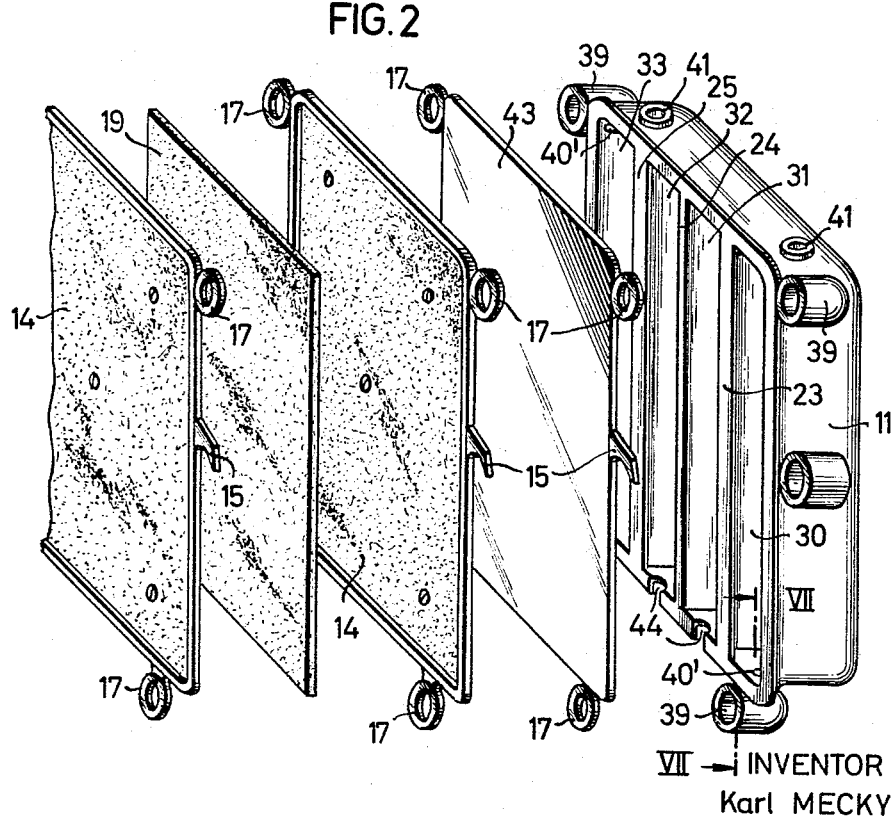
FIGURE 2 is an exploded isometric view of a portion of the right-hand side of FIG. 1.

Referring now to the drawing in detail and FIGS. 1 and 2 thereof in particular, the filter press shown in FIG. 1 comprises a fixed lid 10 and a movable lid 11. Connected to the movable lid 11 is a threaded spindle 12 by means of which lid 11 may be displaced towards and away from fixed lid 10.

Figure 4:
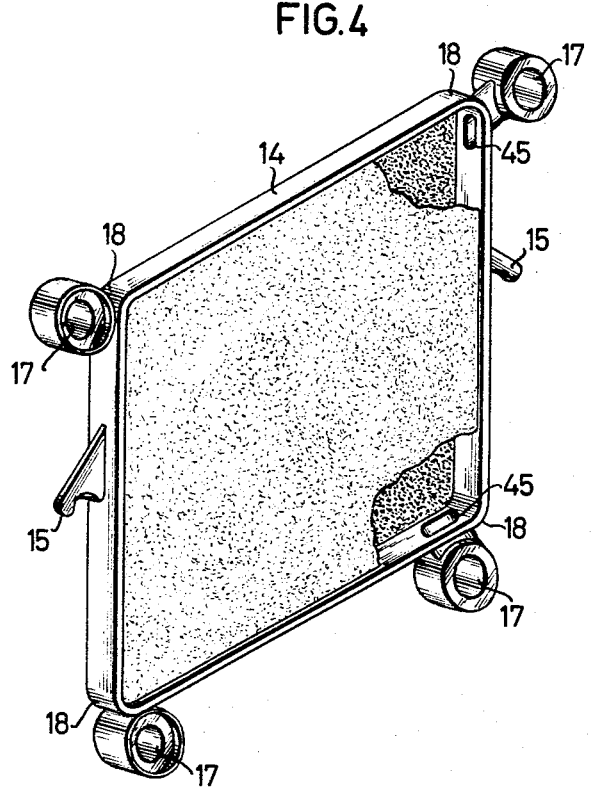
FIGURE 4 is an isometric view of a filter element for use in the filter press of FIG. 1.
Figure 5:
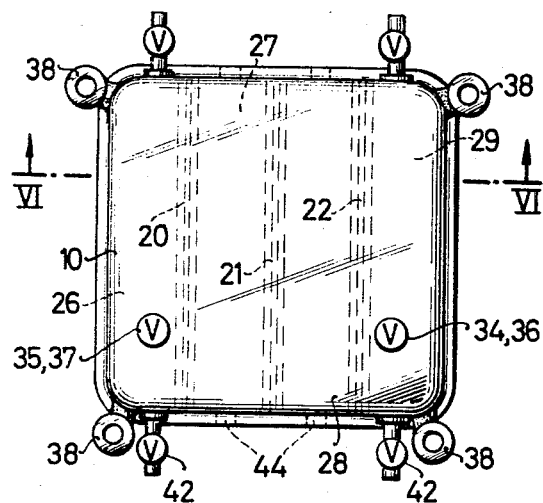
FIGURE 5 shows one lid of the filter press of FIG. 1, as seen in the direction of the arrow A of FIG. 1.
Figure 7:
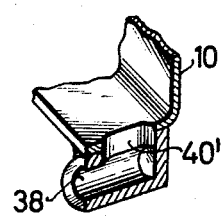
FIGURE 7 is a section taken along the line VII—VII of FIG. 2.

Interposed between the two lids 10 and 11 is a filter packet generally designated with the reference numeral 13 and composed of a plurality of filter plates 14. Filter plates 14 displaceably rest, by means of arms 15 on lateral parallel guiding rods 16 of which one only is being shown in FIG. 1. Each of said filter plates 14 (see FIG. 4) is provided with four annular conduit sections 17 which are connected to marginal portions 18 of the respective filter plate 14. Filter layers 19 are interposed between adjacent plates 14 for the filtration of liquids.

Fixed lid 10 and movable lid 11 are hood-shaped and are on the inside thereof provided with partitions 20, 21, 22 and 23, 24, 25 respectively. These partitions are fixedly connected to the bottom 10a and 11a of the respective lid and extend substantially perpendicularly to the respective bottom 10a and 11a. The partitions subdivide the interior of the respective lid into a plurality of substantially parallel separate chambers 26, 27, 28, 29 and 30, 31, 32, 33 respectively. Thus, the partitions confine passages and simultaneously contribute to the stiffening of the respective lid.

Chamber 26 of lid 10 is connected to a liquid supply conduit 34 for a "cloudy" liquid to be filtered. The rate of flow to chamber 26 may be adjusted by a valve 36. Similarly, chamber 29 of lid 10 communicates with a conduit 35 for discharging the filtered liquid from the filter press. Conduit 35 is provided with a control valve 37.

Figure 3:
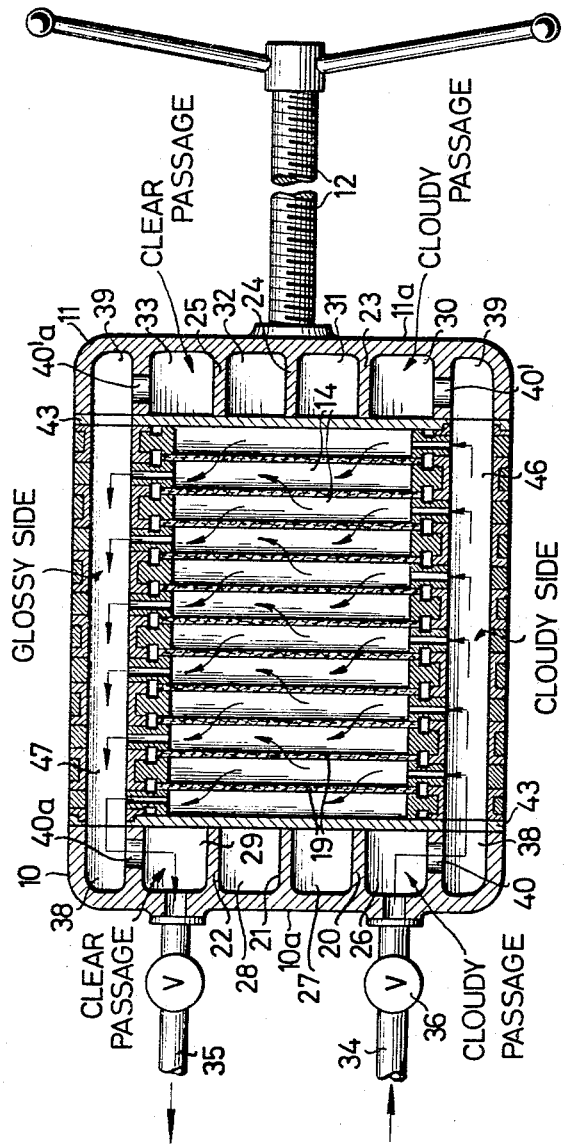
FIGURE 3 is a longitudinal horizontal section through the filtering apparatus of FIG. 1 in assembled condition.
Figure 6:
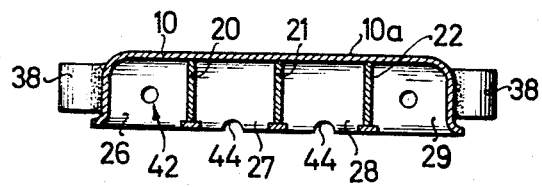
FIGURE 6 is a section taken along the line VI—VI of FIG. 5.

Lids 10 and 11 are provided with annular conduit sections 38 and 39 respectively, in a manner similar to the filter plates 14 being equipped with annular conduit section 17. Each of these conduit sections 38 and 39 of lids 10 and 11 communicates with the respective adjacent chamber of the respective lid through a passage 40, 40a and 40', 40'a (FIG. 3). Furthermore, chambers 26, 29, 30 and 33 are provided with venting devices 41 (FIG. 2) and are also provided with discharging means 42 (FIG. 8) e.g. discharge valves. At both ends of the filter packet 13 composed of filter plates 14 and filter layers 19, there is provided a plain cover plate 43 as clearly shown in FIGS. 1 and 2. Cover plates 43 close the respective adjacent hood-shaped filter lid 10, 11 in assembled condition of the filter press with regard to the filter packet 13. Walls of chambers 27, 28 and 31, 32 respectively have cutouts 44 (FIGS. 2 and 6) through which these chambers are adapted to communicate with the atmosphere. These cutouts 44 prevent a communication between the filtered and unfiltered liquid in case the filter is not tight, i.e. the respective cover plate 43 does not completely close the respective lid with regard to the filter packet.

As has been mentioned above, filter packet 13 consists of a plurality of filter plates 14 alternating with filter layers 19. Each two annular conduit sections 17 of a filter plate (FIG. 4), namely the upper and lower conduit section on one and the same side with regard to the longitudinal axis of the filter press, is provided with a passage 45 communicating with the interior of the filter plate. The remaining two conduit sections on the other side of the respective filter plate are so-called blind conduit sections. In other words they are not provided with passages 45. The filter plates 14 are so arranged in the filter packet 13 that the conduit sections provided with passages 45 are located alternately on the left side and the right side of the longitudinal axis of the filter press. When the filter press is closed, the upper and lower conduit sections on one side of the press form the feeding conduits 46 (FIG. 3) for the cloudy liquid while the conduit sections on the other side of the press form the discharge conduits 47 for the filtered liquid.

*Operation*

When the filter press is closed and a cloudy liquid enters the fixed lid 10 through conduit 34 and valve 36, it enters chamber 26 and from there passes through the passages 40 in the upper and lower conduit sections 38 into the conduit sections 17 of filter plates 14 forming the upper and lower feeding conduits 46 (FIG. 3). From these upper and lower feeding conduits 46 the cloudy liquid enters the interior of those filter plates 14 which are in communication with the conduit sections 17 of conduits 46 through passages 45. From the interior of these plates 14 the still cloudy liquid passes through the respective adjacent filter layer 19 and enters the respective adjacent filter plate as filtered liquid or filtrate. From these last mentioned filter plates the filtrate passes through the passages 45 into the upper and lower discharge conduits 47. From conduits 47 the filtered liquid passes through passages 40a into chamber 29 of lid 10 and from there into discharge conduit 35.

It is very advantageous to equip the filter plates 14 with four conduit sections 17 for purposes of facilitating the assembly of the liquid conducting passages on the cloudy and also on the clear or glossy side, while at the same time the design of the gaskets to be inserted between adjacent plates is simplified. Moreover, the gaskets can be used without difficulties for all filter layers to be inserted.

The modification of FIG. 3a differs structurally from that of FIGS. 1–3 merely in that the clear passage outlet in FIG. 3a is provided in lid 11 rather than in lid 10 as is the case with the embodiment of FIGS. 1–3. The operation of the filtering apparatus of FIG. 3a fully corresponds to that of FIGS. 1–3.

A filtering apparatus somewhat modified over that of FIGS. 1–3 and 3a is shown in FIGS. 8 and 9. In FIGS. 8 and 9 elements identical to those employed in the filter press according to FIGS. 1 and 2 have been designated with the same reference numerals as in FIGS. 1 and 2. The filter press according to FIGS. 8 and 9 differs from that according to FIGS. 1 and 2 primarily in that the plain cover plates 43 of FIGS. 1 and 2 have been replaced by hood-shaped bodies 48 open to the respective adjacent lid 10, 11 and closed toward the filter packet. Interposed between bodies 48 and the respective adjacent lids 10, 11 is a rubber seal 49 which is firmly pressed against the open side of the respective lid when the filter press is in closed position. Each hood-shaped body 48 is provided with ribs 50. The number and arrangement of these ribs corresponds to those of the respective adjacent lid. When pressing the hood-shaped body 48 with rubber seal 49 against the inside of the respective adjacent lid, when the filter press is closed, the cross section and thus the volume of the chambers 26, 27, 28, 29 and 30, 31, 32, 33 is considerably enlarged so that a buffer effect will be obtained when the filter is in operation. This buffer effect is highly favorable when pressure variations occur during the filtration of a liquid.

Each hood-shaped body 48 is provided with four conduit sections 51 which communicate with the respective adjacent chamber of the hood-shaped body through passages 52 in a manner similar to the conduit sections 17 of filter plates 14 being provided with passages 45 and the conduit sections 38 and 39 of lids 10 and 11 of FIGS. 1 and 2 being provided with passages 40, 40a and 40', 40'a. It is to be understood that in the instance of FIGS. 8 and 9 lids 10 and 11 do not have to be provided with conduit sections 38 and 39. In all other respects the filter press according to FIGS. 8 and 9 is identical to that according to FIGS. 1 and 2.

It is, of course, to be understood that the present invention is by no means limited to the particular constructions shown in the drawings but also comprises modifications within the scope of the appended claims.

Thus, while in the arrangement according to FIG. 3 the inlet chamber 26 and the outlet chamber 29 are both provided in the stationary lid 10, it is of course to be understood that one of these chambers could be provided in the stationary lid and the other in the movable lid 11. In this instance, of course, the connection with the liquid supply source or the liquid discharge would have to be effected through a flexible conduit, such as a hose, connected to the movable lid.

What I claim is:

1. A filtering apparatus which includes: a packet of plate means comprising a plurality of hollow filter plate means and a plurality of filter layer means interposed between and in close engagement with said filter plate means, said packet of plate means also including two cover plate means substantially aligned with and confining therebetween all of said filter plate means and said filter layer means, two lid means spaced from each other in axial direction of said apparatus and respectively located adjacent to said cover plate means and adapted to engage and confine said packet therebetween, said cover plate means being such as to prevent direct passage of liquid from said filter plate means through said filter layer means into said lid means and vice versa, each of said lid means having a bottom and also having side walls and partitions substantially perpendicular to said bottom so as to divide the interior of each of said lid means into a plurality of separate chamber means open towards said packet, one of the chamber means of one of said lid means forming an inlet chamber adapted to be connected with a supply of liquid to be filtered, another one of the chamber means of one of said lid means forming a discharge chamber adapted to be connected to a discharge conduit for discharging filtered liquid, first conduit section means respectively connected to said filter plate means and together forming first continuous conduit means establishing communication between said inlet chamber and one of the chamber means other than said discharge chamber and located in the respective lid means not containing said inlet chamber, and second conduit section means respectively connected to said filter plate means and together forming second continuous conduit means establishing communication between said discharge chamber and one of the chamber means other than said inlet chamber and located in the respective lid means not containing said discharge chamber, said first conduit means communicating with the interior of every other filter plate means, and said second conduit means communicating with the interior of those filter plate means which are not in communication with said first conduit means.

2. A filtering apparatus according to claim 1, in which one of said lid means is stationary and the other one of said lid means is movable in axial direction of said apparatus, said cover plate means which is nearest to said movable lid means including a hood-shaped body comprising two separate compartments closed to the respective adjacent filter layer means and respectively open to separate chamber means in said movable lid means and respectively communicating with said first and second conduit means.

3. A filtering apparatus according to claim 2, in which that cover plate means which is closest to said movable lid means also includes gasket means interposed between said movable lid means and said hood-shaped body and provided with two cutouts aligned with and substantially corresponding in shape to the respective adjacent side of two compartments and said two chamber means.

4. A filter press according to claim 1, in which both said inlet chamber and said discharge chamber are provided in one and the same lid means.

5. A filter press according to claim 1, in which said inlet chamber and said discharge chamber are respectively provided in different lid means.

6. Lid means for use in connection with a filtering apparatus, which comprises: a bottom and side walls and also partitions substantially perpendicular to said bottom so as to divide the interior of said lid means into first chamber means for receiving non-filtered liquid and second chamber means separate from said first chamber means for receiving filtered liquid, said lid means also comprising first conduit section means for conveying non-filtered liquid, said lid means further comprising second conduit section means arranged for conveying filtered liquid, said lid means including first passage means extending from said first chamber means to said first conduit section means to establish communication therebetween, said lid means also including second passage means separate from said first passage means and extending from said second conduit section means to said second chamber means to establish communication therebetween.

7. Lid means according to claim 6, which includes conduit means communicating with said first chamber means and adapted to be connected to a supply of liquid to be filtered.

8. Lid means according to claim 6, which includes conduit means communicating with said second chamber means and adapted to be connected to a discharge for discharging filtered liquid.

9. Lid means according to claim 6, which includes first conduit means communicating with said first chamber means for connection to a supply of liquid to be filtered, and which also includes second conduit means communicating with said second chamber means for connection with a discharge line to dischatrge filtered liquid.

10. Lid means according to claim 6, which includes: a first lid section and a second lid section separate from said first lid section, each of said lid sections having a bottom and also having side walls and partitions substantially perpendicular to said bottom and dividing the respective lid section into a plurality of separate sectional compartments including a first compartment section and a second compartment section separate from said first compartment section, said first and second lid sections having one side open and facing each other, and gasket means interposed between said first and second lid sections and provided with cutouts respectively in alignment with said first and second compartment sections of said first and second lid sections, said first and second conduit section means being arranged on one of said lid sections and respectively communicating therethrough with said first and second sectional compartments thereof.

11. Lid means according to claim 6, in which said first and second chamber means are separated from each other by third chamber means having opening means communicating with the atmosphere.

References Cited

UNITED STATES PATENTS

| 393,633 | 11/1888 | Enzinger | 210—228 |
| 638,949 | 12/1899 | Ackermann | 210—224 |
| 2,702,126 | 2/1955 | Bennett et al. | 210—231 |
| 3,015,395 | 1/1962 | Stram et al. | 210—225 X |
| 3,241,678 | 3/1966 | Wrotnowski | 210—231 |

FOREIGN PATENTS

| 1,023,596 | 12/1952 | France. |
| 973,337 | 10/1964 | Great Britain. |

SAMIH N. ZAHARNA, *Primary Examiner.*

REUBEN FRIEDMAN, *Examiner.*

C. DITLOW, *Assistant Examiner.*